United States Patent Office

3,088,938
Patented May 7, 1963

3,088,938
PROCESS FOR CURING VINYLIDENE FLUORIDE-HEXAFLUOROPROPENE COPOLYMERS
Edward F. Cluff, Wilmington, Del., assignor to E. I. du Pont de Nemours and Company, Wilmington, Del., a corporation of Delaware
No Drawing. Filed Dec. 6, 1961, Ser. No. 157,564
6 Claims. (Cl. 260—87.7)

This invention relates to a curing process for fluoroelastomers and more particularly to an improved process for curing fluoroelastomers in the presence of selected quinone compounds.

Elastomeric copolymers of vinylidine fluoride and hexafluoropropene have become of particular value because of their stability at high temperatures and their resistance to a wide variety of solvents, oils, fuels, and the like. While these elastomeric copolymers may be cross-linked or cured in a number of ways, a preferred method of curing is by the use of hexamethylenediamine carbamate and a basic metal oxide. In compounding and processing these elastomers, temperatures are sometimes reached which cause premature cross-linking or scorching.

It is an object of the present invention to provide an improved process for curing fluoroelastomers which have a tendency to undergo premature vulcanization. A further object is to provide an improved process for curing elastomeric copolymers of vinylidene fluoride and hexafluoropropene in the presence of hexamethylenediamine carbamate and selected quinone compounds. Other objects will appear hereinafter.

These and other objects of this invention are accomplished by a process of curing elastomeric copolymers of vinylidene fluoride and hexafluoropropene which comprises heating said copolymer in the presence of a basic metal oxide with from about 1 to 4 parts by weight per 100 parts by weight of said copolymer of hexamethylenediamine carbamate with the proviso that prior to heating from about 0.1 to 3 parts by weight of a quinone compound is incorporated with said copolymer, said quinone compound being selected from the group consisting of p-benzoquinone; chloro-substituted p-benzoquinones such as 2,3- or 2,5-dichloro-p-benzoquinone, trichloro-p-benzoquinone and tetrachloro-p-benzoquinone; trichloromethoxy-p-benzoquinone; 2-methoxy-5-methyl-p-benzoquinone; 2-hydroxy-1,4-naphthoquinone; and quinhydrone.

The essence of the present invention resides in the incorporation into a compounded elastomer prior to vulcanization of a certain quinone compound. It has been found that when a quinone compound from the list recited above is added to a curing recipe containing hexamethylenediamine carbamate and a basic metal oxide, the Mooney scorch time of the stock is significantly increased and good quality vulcanizates are obtained. If desired, mixtures of one or more of the quinone compounds defined above may be employed.

The fluoroelastomers to be cured by the process of this invention are copolymers containing 30 to 70 percent by weight of vinylidene fluoride units and 70 to 30 percent by weight of hexafluoropropene units, with a preferred elastomeric copolymer containing between about 53 and 70 percent by weight of vinylidene fluoride units. These copolymers are described in "Industrial and Engineering Chemistry," vol. 49, page 1687 (1957); French Patent 1,153,164; Italian Patent 553,285 and British patent specification 789,786.

The process of this invention is carried out by compounding every 100 parts of the fluoroelastomer with about 1 to 4 parts of hexamethylenediamine carbate, 5 to 25 parts of a basic metal oxide, and 0.1 to 3 parts of the quinone compound, all parts being by weight.

The amounts of quinone compound and hexamethylenediamine carbamate required will depend on the degree of resistance to premature vulcanization and state of cure desired, as well as on the particular quinone compound used. If less than about one part of hexamethylenediamine carbambate is used, by weight per 100 parts of copolymer, the vulcanizates will be too low in modulus and tensile strength. At least about 0.1 part of the quinone compound is necessary to effect a significant reduction in the scorchiness of the stock. The maximum amounts of both compounds to be used are limited only by the requirements for scorch resistance and state of cure.

Processing safety increases with increasing amounts of the quinone. The presence of the quinone compound in a curing recipe decreases the effectiveness of the hexamethylenediamine carbamate curing agent. This effect can be compensated for by using slightly higher levels of hexamethylenediamine carbamate. By proper selection of the amounts of the quinone compound and of the curing agent it is possible to control independently processing safety and final vulcanizate physical properties within relatively broad limits. Such a selection is within the scope of one skilled in the art.

Examples of suitable basic metal oxides to be used in practicing this invention are magnesia, litharge, and zinc oxide. Magnesia is the preferred metal oxide. Less than 5 parts by weight per hundred parts of copolymer of the metal oxide yields an insufficiently cured vulcanizate. There is usually no advantage in using more than 25 parts of the metal oxide. The preferred amount is 15 to 20 parts.

The usual fillers, such as carbon black, silica, whiting, blanc fixe, clays, and diatomaceous earth, may be used. Pigments may be incorporated for color effects. Plasticizers may be used. Examples of suitable plasticizers are dioctyl sebacate and tricresyl phosphate. Dyes and other materials conventionally used in processing elastomers may be added if desired.

The curing agents of this invention and the quinone additive are incorporated into the fluoroelastomer, along with the other compounding ingredients, by conventional means such as by milling in heavy-duty mixers or the usual rubber milling equipment. The ingredients may be incorporated in the copolymer in any order desired. Ordinarily, water-cooled milling equipment is used so that curing or cross-linking temperatures are not reached.

After the fluoroelastomer has been completely compounded, the stock obtained is cured by heating. In general, temperatures of about 100 to 205° C. are used. In order to reach as complete a state of cure as possible, at least the final portion of the curing cycle is carried out in an open oven at about 200 to 205° C. Thin films (for example, about 0.1 inch in thickness) or small articles from which water vapor and other gaseous by-products of the cure can escape may be vulcanized directly this way. However, larger articles of thicker cross-section need a preliminary curing treatment under compression in a mold to develop sufficient cross-links to prevent rupture and sponging from occurring when they are heated in an open oven. Accordingly, the cure is frequently carried out in two stages. In the first stage the elastomer is heated at 150–250° C. in a mold under pressure ("press-cured") for 5 to 60 minutes, depending on the size and thickness of the article involved. The elastomer is then heated in the oven at about 200° C. or above. Usually 8 to 24 hours will give a completely cured product.

The following examples will better illustrate the nature of the present invention; however, the invention is not intended to be limited to these examples. Parts are by weight unless otherwise indicated.

Examples

A compounded stock is prepared using a copolymer containing by weight, approximately 60 percent of vinylidene fluoride units and 40 percent of hexafluoropropene units, which copolymer has an inherent viscosity of about 1.0 (etermined at 30° C. using 0.1 gram of copolymer in 100 milliliters of a solvent consisting of 86.1 weight percent of tetrahydrofuran and 13.9 weight percent of dimethylformamide). Compounding is accomplished on a two-roll mill using the following recipe:

| | Parts by weight |
|---|---|
| Copolymer | 100 |
| Magnesium oxide | 16 |
| Medium thermal carbon black | 20 |
| Hexamethmylenediamine carbamate | As shown |
| Quinone compound | As shown |

The compounded stock is given a preliminary cure by heating under pressure (20,000 p.s.i. platen pressure) for 30 minutes at 150° C. The formed samples are then given a final cure by warming in a circulating air oven from 25° C. to 204° C. over a 2.5-hour period and then maintaining the temperature at 204° C. for an additional 24 hours.

The stress-strain data are obtained at 25° C. using strips 4 x 0.25 x about 0.075 inches in dimension on an Instron tensile testing machine, at a crosshead speed of 10 inches per minute. The curing characteristics of the unvulcanized mixtures (scorch rate) are measured at 121° C. by ASTM Method D 1077–49 T. The abreviations used in the following table have the significance:

$M_{200}$=modulus at 200% elongation
$T_B$=Tensile strength at the break
$E_B$=Elongation at the break

| Ex. | Quinone Compound | Parts Quinone Compound | Parts HMDC[1] | Scorch Data | | Stress-Strain Data | | |
|---|---|---|---|---|---|---|---|---|
| | | | | Minimum (Mooney No.) | Min. to 10-Point Rise | $M_{200}$, p.s.i. | $T_B$, p.s.i. | $E_B$, percent |
| 1 | None | | 1.00 | 43 | 12 | 1,280 | 2,040 | 280 |
| 2 | do | | 1.25 | 42 | 10.5 | 1,670 | 2,280 | 240 |
| 3 | do | | 1.50 | 42 | 10 | 2,500 | 2,660 | 210 |
| 4 | Tetrachloro-p-benzoquinone | 0.10 | 1.00 | 50 | 20 | 710 | 2,300 | 420 |
| 5 | do | 0.20 | 1.40 | 50 | 16 | 1,210 | 1,910 | 270 |
| 6 | do | 0.30 | 1.40 | 53 | 26 | 835 | 1,970 | 360 |
| 7 | do | 0.40 | 1.80 | 51 | 16 | 1,570 | 2,220 | 260 |
| 8 | do | 0.50 | 1.80 | 42 | 20 | 1,050 | 2,480 | 340 |
| 9 | do | 0.60 | 1.80 | 56 | 32 | 1,030 | 2,070 | 305 |
| 10 | do | 0.50 | 2.00 | 55 | 20 | 1,810 | 2,180 | 230 |
| 11 | do | 0.60 | 2.00 | 42 | 21.5 | 1,310 | 2,310 | 300 |
| 12 | do | 0.70 | 2.00 | 55 | 30 | 1,130 | 1,860 | 280 |
| 13 | p-Benzoquinone | 2.00 | 2.00 | 47 | 45 | 1,350 | 1,910 | 260 |
| 14 | do | 0.67 | 1.29 | 42 | 24 | 1,220 | 1,980 | 285 |
| 15 | do | 1.08 | 1.71 | 40 | 24 | 1,790 | 2,140 | 230 |
| 16 | do | 1.50 | 2.15 | 40 | 24 | | 2,210 | 190 |
| 17 | 2-Methoxy-5-methyl-p-benzoquinone | 0.30 | 1.00 | 48 | 22.5 | 980 | 2,180 | 320 |
| 18 | 2,3,5-Trichloro-6-methoxy-p-benzoquinone | 0.30 | 1.00 | 54 | 35 | 580 | 1,810 | 490 |
| 19 | 2-Hydroxy-1,4-naphthoquinone | 0.30 | 1.00 | 45 | 23 | 870 | 2,610 | 400 |
| 20 | 2,5-Dichloro-p-benzoquinone | 0.30 | 1.00 | 53 | 34 | 610 | 1,850 | 440 |
| 21 | Quinhydrone | 0.30 | 1.00 | 49 | 22 | 840 | 2,200 | 380 |

[1] HMDC=hexamethylenediamine carbamate.

As many widely different embodiments of this invention may be made without departing from the spirit and scope thereof, it is to be understood that this invention is not limited to the specific embodiments thereof except as defined in the appended claims.

What is claimed is:

1. In the process of curing an elastomeric copolymer of vinylidene fluoride and hexafluoropropene in the presence of a basic metal oxide with from about 1 to 4 parts by weight per 100 parts by weight of said copolymer of hexamethylenediamine carbamate, the improvement comprising incorporating with said copolymer prior to heating from about 0.1 to 3.0 parts by weight of a compound selected from the group consisting of p-benzoquinone, 2,3 - dichloro-p-benzoquinone, 2,5 - dichloro-p-benzoquinone, trichloro - p - benzoquinone, tetrachloro - p - benzoquinone, 2 - methoxy - 5 - methyl - p - benzoquinone, trichloromethoxy - p - benzoquinone, 2 - hydroxy-1,4-naphthoquinone and quinhydrone.

2. The process of claim 1 wherein the elastomeric copolymer contains from about 30 to 70 percent by weight of vinylidene fluoride units and about 70 to 30 percent by weight of hexafluoropropene units.

3. The process of claim 2 wherein the basic metal oxide is magnesia.

4. In the process of curing an elastomeric copolymer containing from about 30 to 70 percent by weight of vinylidene fluoride units and about 70 to 30 percent by weight of hexafluoropropene units in the presence of a basic metal oxide with from about 1 to 4 parts by weight per 100 parts by weight of said copolymer of hexamethylene-diamine carbamate, the improvement comprising incorporating with said copolymer prior to heating from about 0.1 to 3.0 parts by weight of p-benzoquinone.

5. In the process of curing an elestomeric copolymer containing from about 30 to 70 percent by weight of vinylidene fluoride units and about 70 to 30 percent by weight of hexafluoropropene units in the presence of a basic metal oxide with from about 1 to 4 parts by weight per 100 parts by weight of said copolymer of hexamethylene-diamine carbamate, the improvement comprising incorporating with said copolymer prior to heating from about 0.1 to 3.0 parts by weight of tetrachloro-p-benzoquinone.

6. In the process of curing an elastomeric copolymer containing from about 30 to 70 percent by weight of vinylidene fluoride units and about 70 to 30 percent by weight of hexafluoropropene units in the presence of a basic metal oxide with from about 1 to 4 parts by weight per 100 parts by weight of said copolymer of hexamethylene-diamine carbamate, the improvement comprising incorporating with said copolymer prior to heating from about 0.1 to 3.0 parts by weight of quinhydrone.

No references cited.